Dec. 10, 1957
L. E. ALEXANDER
2,815,530
APPARATUS FOR MOUNTING FOOD
Filed March 11, 1955
2 Sheets-Sheet 1
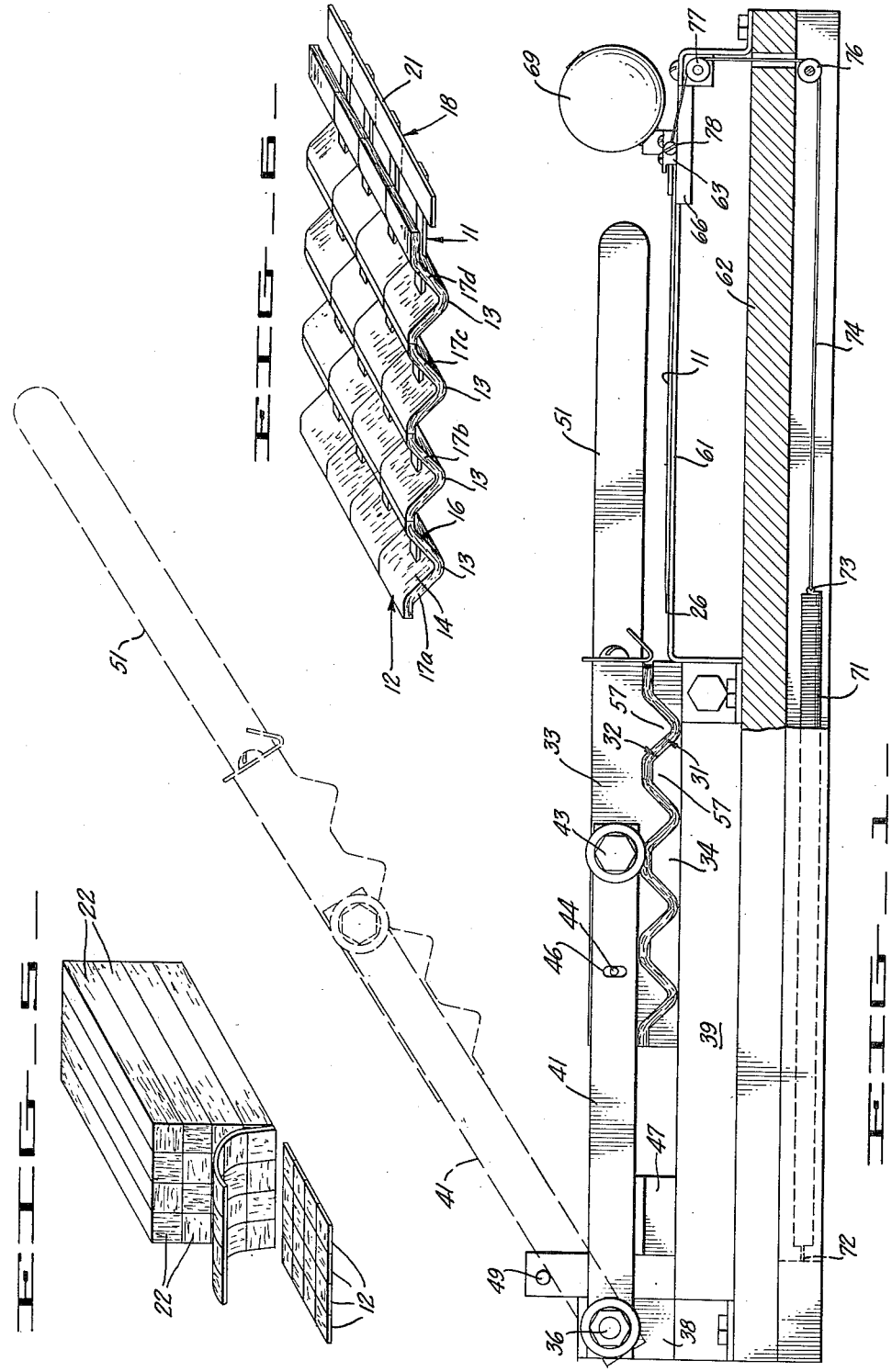

Dec. 10, 1957 L. E. ALEXANDER 2,815,530
APPARATUS FOR MOUNTING FOOD
Filed March 11, 1955 2 Sheets-Sheet 2
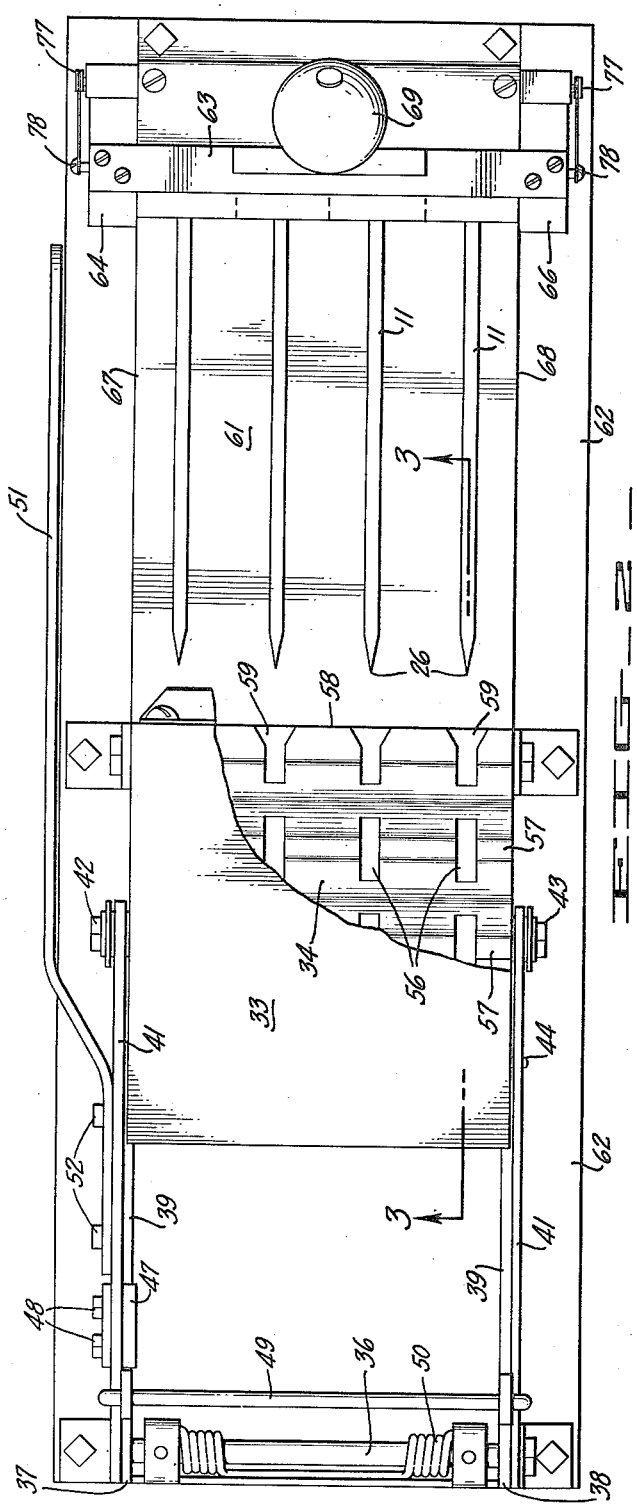
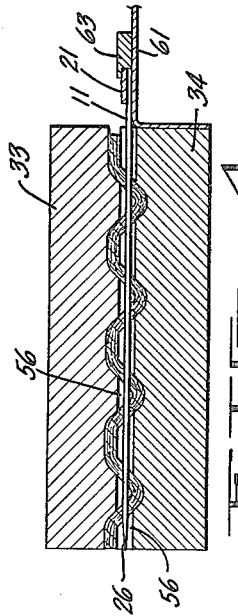
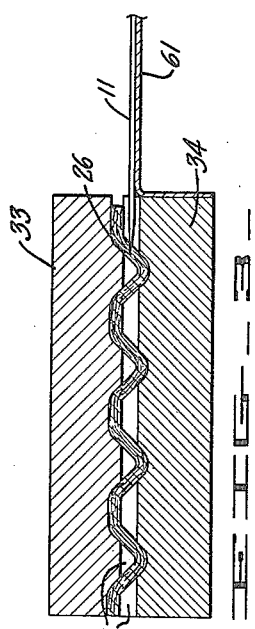
INVENTOR.
Leo E. Alexander
BY
William D. Hager
ATTORNEY United States Patent Office 2,815,530
Patented Dec. 10, 1957

2,815,530

APPARATUS FOR MOUNTING FOOD

Leo E. Alexander, Orinda, Calif.

Application March 11, 1955, Serial No. 493,780

4 Claims. (Cl. 17—1)

The invention relates to mounting food and more particularly to the mounting of food for broiling, barbecuing or the like upon skewers from which the food may be eaten.

With the advent of quick-freezing techniques and the widespread use of store and home frozen food storage cabinets, a new field of business has come into being which deals with the production of frozen foods adapted for immediate cooking and involving a minimum of bothersome preparation. Coincidental with the rise of this field of business is a growing popularity in the cooking of foods by broiling or barbecuing. The present invention contemplates the production of a food product consisting of segments of a foodstuff such as meat, fish or the like, which is mounted upon a skewer in a manner permitting broiling or barbecuing of the food and the subsequent eating of the food directly from the skewer.

Considerable difficulties have been encountered in the production of foods of this description, among which are the high cost of hand labor in mounting the segments upon the skewers, and the difficulty of mounting the food so that it will be firmly retained during cooking, while at the same time making it easily removable during the subsequent process of eating. It is therefore an object of the present invention to provide a method and apparatus for mounting food on a skewer in a manner which will securely retain the food thereon during cooking but permit easy and convenient removal of the food to facilitate its consumption directly from the skewer.

Another object of the present invention is the provision of a method of forming and processing food for mounting upon a skewer in which the food is formed in a series of bite size segments disposed in contiguous relation on the skewer for thorough cooking and convenient removal therefrom.

A further object of the invention is to provide a method of processing and mounting a strip of food upon a skewer in an appealing and secure manner.

A still further object of the invention is the provision of a method of forming uniform strips of food and mounting same in an even and consistent manner upon a skewer so as to provide an attractive and uniform product.

Yet another object of the invention is to provide a method of the character described in which the strips of food are composed of bite size segments which, upon cooking, are readily separable from the rest of the strip for easy removal from the skewer.

Another object of the invention is the provision of an apparatus for rapid and easy mounting of strips of food upon skewers in a uniform and consistent manner.

Still another object of the invention is the provision of an apparatus of the character above which is adapted for the mounting of strips of food on a plurality of parallel, side by side skewers resulting in greater ease in handling of the food during cooking.

A further object of the invention is to provide an apparatus of the character described which will first form, and thereafter securely retain, the food in position for an easy and simple insertion of the skewer therethrough.

Another object of the invention is the provision of an apparatus of the character hereindescribed which will guide the insertion of the skewer through the food in a positive and consistent manner.

Other objects and features of advantage will be apparent from a consideration of the following description and the accompanying drawings, wherein:

Figure 1 is a side elevational view of the apparatus for mounting food constructed in accordance with the present invention and with portions broken away and shown in section for clarity.

Figure 2 is a plan view of the apparatus of Figure 1, with portions broken away and in section.

Figure 3 is a fragmentary longitudinal section taken substantially on the plane of line 3—3 of Figure 2.

Figure 4 is a view similar to that of Figure 3 but showing the apparatus in a different position.

Figure 5 is a perspective view of a loaf of food produced during the practice of the method of the present invention.

Figure 6 is a perspective view of a food product resulting from the operation of the method and apparatus of the present invention.

The method of the present invention consists briefly of shaping a strip of the food to be mounted into a ripple form to provide a series of consecutive waves along the length of the strip, and inserting a suitable elongated skewer through each of the waves along the strip in such manner that the strip is firmly impaled on the skewer. With reference to Figure 6 of the drawings, it will be seen that the skewers 11 are of elongated form and the strips 12 extend substantially the length thereof, with each of the waves 13 being penetrated at two points, viz., at the central portions of the upslope 14 and of the downslope 16. Mounting of the food in this manner provides the dual advantage of securely supporting the entire length of the strip and at the same time covering the major portion of the skewer so as to protect it from the heat required for cooking.

In order to facilitate eating of the food directly from the skewer it is desired to provide for ready separation of each bite of food from the next. As a feature of the present invention this ready separation of bites of food is provided by fabricating each food strip from a plurality of contiguous, bite-size segments 17a, 17b, 17c, and 17d which tend to stay together in a continuous strip during the insertion of the skewers, but which, upon cooking, become easily separable. This is here accomplished by partially freezing the individual segments of food into the desired strip, it being apparent that the subsequent cooking will melt the frozen bond between adjacent segments and permit their easy and convenient removal in one at a time order from the skewer by oral manipulation of the person eating the food.

As an important feature of the present invention, the segments 17a—17c making up the individual strips are proportioned so that when the strip is shaped to a ripple form, as described above, each segment will correspond to one complete wave, see Figure 6. In this manner, penetration of each wave through the upslope 14 and the downslope 16 as aforesaid, will securely mount each segment on the skewer so that melting of the frozen bond between segments during cooking will have no appreciable effect and the individual segments will be firmly held in place. At the same time, the double penetration and individual mounting allow an easy sliding action of the segments of food along the skewer during eating of the food therefrom.

As another feature of the invention, the individual strips 12 are also frozen together to provide a continuous sheet of separable side by side strips which is especially well adapted for broiling. Such a sheet may be easily mounted upon a multiple skewer unit 18 as illustrated by Figure 6 of the drawing. As may be seen from Figures 2 and 6 of the drawings, such multiple skewer unit includes a plurality of spaced parallel skewers 11 attached at one end to a divisible, substantially rigid header 21, this construction making possible the simultaneous cooking of a number of food strips mounted thereon, and at the same time providing for convenient separation of the skewers for individual eating of the cooked food.

In accordance with the present invention, the sheets of rows of segments are formed by freezing a plurality of pieces or sticks 22 of the food being processed into a loaf, see Figure 5, and thereafter severing slices from the loaf in the manner shown. This operation results in a sheet composed of the desired number of rows 12 of segments, the width of each row, of course, being the same as the spacing of the skewers 11 in the multiple unit to insure proper alignment of each skewer with its strip. As will be apparent from Figure 6, the segments are preferably of approximately the same size and are arranged in checkerboard fashion so that the waves 13 will be aligned across the several strips and thus afford a neat and attractive product.

In the mounting of the skewers 11 through the individual strips 12 it is necessary to firmly retain the strips in the above described ripple form so that the sharpened points 26 of the skewers can be forced through the partially frozen food in the desired manner. To obtain such ripple form and at the same time to provide for firmly retaining the strips, I compress the strips between opposed corrugated surfaces which are complementary to each other and which are adapted upon relative approach, to cooperate with each other in shaping and retaining the strips disposed therebetween. As may best be seen in Figures 1, 3 and 4, the apparatus of the present invention incorporates opposed corrugated surfaces 31 and 32 of this character in die means consisting of a pair of die members 33 and 34. Relative movement between the die members to allow insertion and withdrawal of the food is here provided by a pivotal connection which includes a shaft 36 supported upon standards 37 and 38 forming part of a frame 39 which mounts the lower die member 34, the shaft 36 pivotally supporting a subframe 41 which in turn carries the die member 33. Automatic alignment of the die faces 31 and 32 is effected by pivotally securing die member 33 to its subframe 41 by means of bolt members 42 and 43, the die member 33 being provided with a pin 44 projecting into a slot 46 in subframe 41 to limit the swing of the die member 33 on the pivot. Preferably, a stop member 47 is adjustably secured to the frame 39 by bolts 48 in intercepting relation to the subframe 41 for determining the closest relative approach of the die faces and thus prevent excessive squeezing of the food. A second stop member, to limit the upward swing of subframe 41 to the position shown in phantom lines in Figure 1, is provided by a pin 49 mounted on frame 39 and extending in overlying relation to the subframe; see Figure 2. For added ease of manipulation, an extension handle 51 is secured to the subframe 41 by bolts 52.

As an important feature of the present invention, guide means is provided in the die means for directing the course of movement of the skewers 11 along the length of the food strips 12 to insure penetration and impaling of each of the waves 13. As here shown this guide means consists of a series of aligned slots 56 cut through each of the serrations 57 provided by the aforementioned corrugated surfaces 31 and 32 of the die members 33 and 34. The slots 56 are best shown in Figures 2, 3 and 4, it being noted that the slots are formed and positioned to limit the upward and downward movement, as well as side to side movement, of the skewers 11 so as to insure penetration through each of the waves in a manner exposing a minimum area of the skewers outside of the food itself, thus reducing any possible tendency of the skewers to char during the broiling operation. Preferably, the slots at the side 58 of the die where the skewers enter are widened out to a funnel shaped throat 59 which will cooperate with the point 26 upon any misaligned skewer to bring the latter into alignment within the guide slots.

Means is here provided for receiving and supporting the skewers 11 preparatory to and during their progress between the die members 33 and 34, and as here shown this means consists of a plate 61 mounted against and extending from die side 58, the plate 61 and frame 39 being conveniently supported upon a base member 62. As will be noted from Figures 3 and 4 plate 61 is aligned with the guide slots 56 so that a thrusting action against the header 21 of the skewers will advance the skewers points foremost, through the guide slots 56 to impale the successive waves of food as shown in Figure 4. Means is also provided for exerting such thrusting action; such means here consisting of a bar 63, of inverted L-shape cross section, slidably mounted in overlying relation to the plate 61 and guided therealong by members 64 and 66 which are formed to receive and ride along the opposite edges 67 and 68 of the plate. A handle 69 is provided on the bar 63 for easy grasping and manipulation. Preferably, the bar 63 is adapted to return automatically to the position shown in the drawings as soon as the handle 69 is released. Such return is here effected by a spring 71 mounted under and secured at one end 72 to the base member 62. The opposite end 73 of the spring is attached to a cord 74 which passes around pulleys 76 and 77, secured to base 62 and plate 61 respectively, the other end of the cord being fastened to bar 63 by screw 78. Upon movement of the bar 63 toward the die members 33 and 34 the spring 71 will be stretched out and, when the handle is released, the tension of the spring will serve to return the bar 63 to starting position.

In view of the foregoing it will be apparent that I have provided a method of mounting food upon a skewer in a manner firmly retaining the food during cooking thereof while still permitting easy and rapid removal of the food for eating directly from the skewer, together with an apparatus well adapted for rapidly and simply effecting such mounting to provide an attractive and readily saleable item.

What is claimed is:

1. An apparatus for simultaneously mounting a plurality of strips of food on elongated skewers, comprising a pair of oppositely disposed relatively movable die members having corrugated faces between which parallel strips of food may be placed to extend transversely to the corrugations upon the faces of said die members, the corrugations upon said die members being disposed to interleave with each other when brought into engagement with the parallel strips of food placed therebetween and form each of said strips of food into a series of waves, a means having a skewer supporting surface disposed at one side of said die members and in a plane medial to the corrugated faces of said die members, the corrugations of said die members having aligned skewer guiding slots cut therein along lines extending at a right angle thereto to accommodate a skewer for each of said strips of food, and means for projecting skewers placed side by side upon the skewer supporting surface of said means endwise therefrom and through the skewer guiding slots and the strips of food when held in a waved condition by said die members, whereby each of the waves formed in said strips of food will be impaled upon a skewer at a plurality of points.

2. An apparatus for mounting strips of food on elongated skewers in the manner described, comprising a pair of die members having opposed corrugated faces between which a plurality of strips of food may be placed in side by side relation, said die members being adapted and arranged upon relative approach of said opposed corrugated faces to form strips of food placed therebetween into a series of upstanding waves along the lengths thereof, the corrugations of said faces having aligned slots at spaced points along their outer limits to provide clearances through which skewers may be passed in a plane medial to the corrugated faces of said die members, and means for projecting a plurality of skewers between the corrugated faces of said opposed die members to thus impale the waves formed in the strips of food when held between said die members with said skewers.

3. A device of the character described, comprising a first die member having a surface of corrugated form providing a series of consecutive parallel waves, a second die member mounted for movement into and out of proximity to said first die member, said second die member also having a surface of corrugated form complementary to and positioned in interleaving relation with the corrugated surface of said first die member, whereby said corrugated surfaces of said die members will cooperate to define a space of wave-like form when brought into proximity to each other, the corrugated surfaces of said die members being formed with spaced skewer guiding slots in a plane medial to the wave-like space formed between said first and second die members, a skewer supporting means contiguous to one of said die members for supporting a plurality of skewers in alignment with the skewer guiding slots in said die members, and a pusher means movable over said skewer supporting means for engagement with said skewers and operable to project the skewers through said guiding slots, whereby strips of food placed between said die members will be impaled in waves upon said skewers.

4. In a device for mounting pieces of food shish-ke-bab fashion upon a skewer, the combination of an elongated supporting frame, a die member mounted upon said frame having corrugations upon its upper surface extending transverse to said elongated frame, a second die member mounted upon said frame for movements into and out of cooperating relation with said first die member having corrugations arranged to interleave with the corrugations of said first die member, whereby strips of food placed between said die members will be formed and held in a series of waves, the corrugations upon the said first and second die members having slots formed in their outer interleaving ridges through which a skewer may be projected in a plane medial to and at a right angle to the corrugated faces of said die members, a supporting plate contiguous to said first die member for supporting a skewer in a plane medial to the corrugation of said die members and in axial alignment with the skewer guiding slots formed therein, and a reciprocating skewer engaging means movable over said supporting plate for projecting a skewer placed thereupon through the skewer guiding slots formed in the corrugations of said die members and impaling the waves of food upon said skewer at spaced points therealong.

References Cited in the file of this patent

UNITED STATES PATENTS

| | | |
|---|---|---|
| 983,056 | Howard | Jan. 31, 1911 |
| 1,778,485 | Davidson | Oct. 14, 1930 |
| 2,031,259 | Fox | Feb. 18, 1936 |
| 2,274,250 | Simpkins | Feb. 24, 1942 |
| 2,303,566 | Majestic | Dec. 1, 1942 |
| 2,398,636 | Henney et al. | Apr. 16, 1946 |
| 2,609,564 | Grimm | Sept. 9, 1952 |

FOREIGN PATENTS

| | | |
|---|---|---|
| 179,385 | Germany | Dec. 1, 1906 |